United States Patent
Hasegawa et al.

(10) Patent No.: US 10,094,849 B2
(45) Date of Patent: Oct. 9, 2018

(54) ROUGH ROAD DETERMINATION DEVICE

(75) Inventors: Ryo Hasegawa, Susono (JP); Yukitoshi Aoyama, Gotenba (JP); Junichi Murase, Susono (JP); Daisuke Hayashi, Mishima (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 1046 days.

(21) Appl. No.: 14/381,704

(22) PCT Filed: Mar. 28, 2012

(86) PCT No.: PCT/JP2012/058120
§ 371 (c)(1),
(2), (4) Date: Aug. 28, 2014

(87) PCT Pub. No.: WO2013/145148
PCT Pub. Date: Oct. 3, 2013

(65) Prior Publication Data
US 2015/0025836 A1   Jan. 22, 2015

(51) Int. Cl.
*F02D 41/14* (2006.01)
*G01P 3/481* (2006.01)
*G01M 15/06* (2006.01)

(52) U.S. Cl.
CPC .......... *G01P 3/481* (2013.01); *F02D 41/1498* (2013.01); *G01M 15/06* (2013.01); *F02D 2200/702* (2013.01)

(58) Field of Classification Search
None
See application file for complete search history.

(56) References Cited

U.S. PATENT DOCUMENTS 6,135,089 A * 10/2000 Shibagaki ........... F02D 41/1486
123/436

FOREIGN PATENT DOCUMENTS

| EP | 0 849 456 A2 | 6/1998 |
| EP | 2 031 223 A2 | 3/2009 |
| JP | 11-078840 A | 3/1999 |
| JP | 2006-347340 A | 12/2006 |

* cited by examiner

*Primary Examiner* — Paul D Lee
*Assistant Examiner* — Mark Crohn
(74) *Attorney, Agent, or Firm* — Sughrue Mion, PLLC (57) ABSTRACT

A rough road determination device (100) is mounted on a vehicle (1) that is equipped with an internal combustion engine (10) having a crank angle sensor (31). This rough road determination device is equipped with determination means (20) for determining whether or not a road on which the vehicle travels is a rough road, by comparing a first amplitude fluctuation amount as an amplitude fluctuation amount of one pulse of an output of the crank angle sensor, which is determined in advance on the basis of a rotational speed of the internal combustion engine, with a second amplitude fluctuation amount as an amplitude fluctuation amount of one pulse that is actually output from the crank angle sensor.

9 Claims, 5 Drawing Sheets

ROUGH ROAD DETERMINATION DEVICE

TECHNICAL FIELD

The invention relates to a technical field of a rough road determination device that determines whether or not a road on which a vehicle, for example, an automobile or the like travels is a rough road.

BACKGROUND ART

As this kind of device, for example, there is proposed a device that makes a determination on a rough road on the basis of a result of a frequency analysis of a rotational speed of a crank angle sensor (see Patent Document 1). Alternatively, there is proposed a device that sets a flag when a state where a wheel acceleration/deceleration assumes a value equal to or larger than a set acceleration/deceleration has continued for, for example, 6 or more milliseconds, and determines that a vehicle travels on a rough road, when the flag is set a predetermined number of times or more within a set time (see Patent Document 2).

RELATED ART DOCUMENTS

Patent Documents

Patent Document 1: Japanese Patent Application Publication No. 2006-347340 (JP-2006-347340 A)
Patent Document 2: Japanese Patent Application Publication No. 11-078840 (JP-11-078840 A)

SUMMARY OF THE INVENTION

Problems to Be Solved by the Invention

In the art described in Patent Document 1, the rotational speed detected by the crank angle sensor is obtained from an interval between output values of the crank angle sensor, which are output several times. Therefore, there is a technical problem in that a relatively long time is required until a result of the determination on a rough road is output in a region where the rotational speed of an engine is low. In addition, according to the art described in Patent Document 1, there is a technical problem in that the determination on a rough road cannot be made when the rotational speed of the engine fluctuates. The art described in Patent Document 2 also has a technical problem in that a relatively long time is required until a result of the determination on a rough road is output.

The invention has been made in view of, for example, the aforementioned problems. It is a task of the invention to provide a rough road determination device that makes it possible to determine whether or not there is a rough road, within a relatively short period of time and even in the case where the rotational speed of an engine fluctuates.

Means for Solving the Problems

In order to achieve the aforementioned task, a rough road determination device according to the invention is mounted on a vehicle that is equipped with an internal combustion engine having a crank angle sensor. The rough road determination device is equipped with determination means for determining whether or not a road on which the vehicle travels is a rough road, by comparing a first amplitude fluctuation amount as an amplitude fluctuation amount of one pulse of an output of the crank angle sensor, which is determined in advance on the basis of a rotational speed of the internal combustion engine, with a second amplitude fluctuation amount as an amplitude fluctuation amount of one pulse that is actually output from the crank angle sensor.

In accordance with the rough road determination device according to the invention, the rough road determination device is mounted on a vehicle, for example, an automobile or the like. The vehicle is equipped with an internal combustion engine, for example, an engine or the like. The internal combustion engine is provided with the crank angle sensor having a circular disc that is attached to a crankshaft, and a signal output unit that outputs a pulse signal in accordance with teeth formed on an outer periphery of the circular disc.

The determination means, which is equipped with, for example, a memory, a processor, a comparator and the like, determines whether or not the road on which the vehicle travels is a rough road, by comparing the first amplitude fluctuation amount as the amplitude fluctuation amount of one pulse of the output of the crank angle sensor, which is determined in advance on the basis of the rotational speed of the internal combustion engine, with the second amplitude fluctuation amount as the amplitude fluctuation amount of one pulse that is actually output from the crank angle sensor.

The first amplitude fluctuation amount may be specified from a current rotational speed of the internal combustion engine and a map. This map or the like, which determines, for example, a relationship between the rotational speed of the internal combustion engine and the amplitude fluctuation amount of one pulse, is structured through an experiment or a simulation.

The studies conducted by the inventor of the present application have revealed the following. That is; in the case where the vehicle travels on a rough road, the crank angle obtained from the crank angle sensor deviates. When it can be detected that the vehicle travels on a rough road, timings for various kinds of control can be calculated through a pseudo signal or a multiplication process. On the other hand, when a determination on a rough road cannot be made during traveling (including when the vehicle travels at non-constant speed, for example, during a transition or the like), a deterioration in exhaust emission properties and a deterioration in fuel economy result from, for example, a deviation in ignition timing, which may cause a problem in view of emission regulations as well. Besides, when the timing of an in-cylinder pressure sensor deviates by 1 degree, the estimated amount of torque deviates by about 7%. Therefore, an entire control system including a transmission may be adversely affected.

As described above, the crank angle sensor has the circular disc that is attached to the crankshaft, and the signal output unit. In the case where the vehicle travels on a normal road, the distance (i.e., the gap) between the circular disc and the signal output unit hardly fluctuates. On the other hand, in the case where the vehicle travels on a rough road, the gap fluctuates relatively greatly as a result of vibrations of the vehicle caused by a road surface. As a result, in the case where the vehicle travels on a rough road, the amplitude value of the pulse signal output from the signal output unit fluctuates greatly as well.

Incidentally, even in the case where the vehicle travels on a normal road, the amplitude value of the pulse signal changes in accordance with the rotational speed of the internal combustion engine. Thus, during low rotation when the rotational speed of the internal combustion engine fluctuates relatively greatly, it is difficult to make a determination on a rough road according to the art described in, for example, Patent Document 1 or the like, in which the determination on a rough road is made using a plurality of pulse signals.

Thus, according to the invention, the determination means determines whether or not the road on which the vehicle travels is a rough road, by comparing the first amplitude fluctuation amount with the second amplitude fluctuation amount. In particular, according to the invention, a determination on a rough road is made in accordance with the amplitude value of each pulse. Therefore, even if the rotational speed of the internal combustion engine is relatively low, it is possible to determine whether or not the road on which the vehicle travels is a rough road. Besides, the determination on a rough road can be made in accordance with the amplitude value of a single pulse. It is therefore possible to determine, within a relatively short period of time, whether or not the road on which the vehicle travels is a rough road.

In one aspect of the rough road determination device according to the invention, the determination means determines whether or not the road on which the vehicle travels is a rough road, by comparing a differential value, which is a value that is obtained by subtracting an amplitude value resulting from the rotational speed of the internal combustion engine from the second amplitude fluctuation amount, with the first amplitude fluctuation amount.

According to this aspect of the invention, a determination on a rough road can be made relatively easily.

In this aspect of the invention, the determination means may determine whether or not the road on which the vehicle travels is a rough road, by comparing the differential value with the first amplitude fluctuation amount when the differential value changes in accordance with a speed of the vehicle.

This configuration makes it possible to improve the accuracy in determining whether or not the road on which the vehicle travels is a rough road, and hence is practically very advantageous.

In another aspect of the rough road determination device according to the invention, the determination means determines that the road on which the vehicle travels is a rough road, when a difference between the first amplitude fluctuation amount and the second amplitude fluctuation amount is equal to or larger than a predetermined value.

According to this aspect of the invention, a determination on a rough road can be made relatively easily.

In another aspect of the rough road determination device according to the invention, the determination means determines that the road on which the vehicle travels is a rough road, when a difference between the first amplitude fluctuation amount and the second amplitude fluctuation amount changes in accordance with a speed of the vehicle.

According to this aspect of the invention, a determination on a rough road can be made relatively easily.

The operation and other advantages of the invention becomes apparent from modes for carrying out the invention, which will be described below.

MODES FOR CARRYING OUT THE INVENTION

Hereinafter, embodiments of a rough road determination device according to the invention will be described on the basis of the drawings.

First Embodiment

The rough road determination device according to the first embodiment of the invention will be described with reference to FIGS. 1 to 6.

(Configuration of Vehicle)

Figure 1:
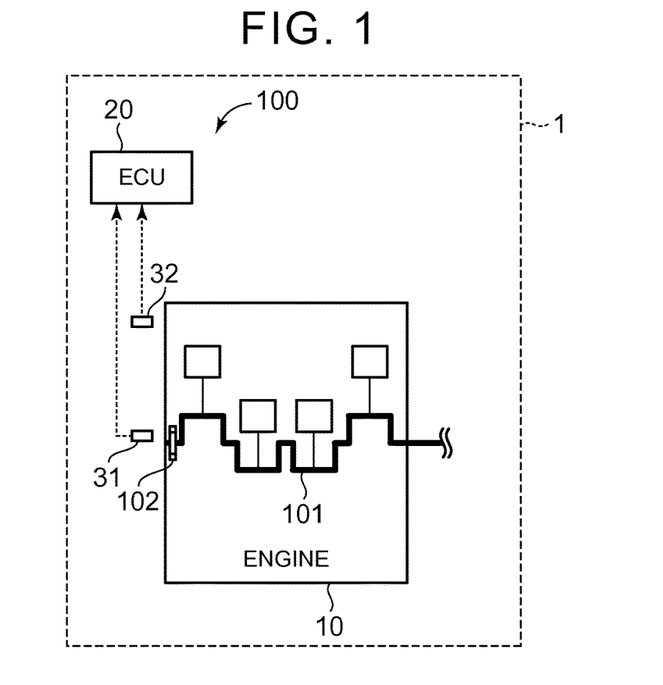
FIG. 1 is a block diagram showing the configuration of an essential part of a vehicle according to a first embodiment of the invention.

First of all, a vehicle 1 that is mounted with a rough road determination device 100 according to the first embodiment of the invention will be described with reference to FIG. 1. FIG. 1 is a block diagram showing the configuration of an essential part of the vehicle according to the first embodiment of the invention. Incidentally, in FIG. 1, detailed members of the vehicle are omitted as appropriate, and only components directly associated with the invention are shown, for the convenience of explanation.

In FIG. 1, the vehicle 1 is configured to be equipped with an engine 10 as an example of "an internal combustion engine" according to the invention, and an electronic control unit (an ECU) 20 that controls the engine 10. Incidentally, the vehicle 1 may be equipped with a motor for driving as well as the engine 10 (i.e., the vehicle 1 may be a hybrid vehicle).

The engine 10 is provided with a crank angle sensor 31 that detects a crank angle of the engine 10, and a cam angle sensor 32 that detects a cam angle of the engine 10. Incidentally, in this embodiment of the invention, the engine 10 is a four-cylinder engine having four cylinders. However, the engine 10 is not limited to this four-cylinder engine, but may be any one of various engines such as a six-cylinder engine, an eight-cylinder engine, a ten-cylinder engine, a twelve-cylinder engine, a sixteen-cylinder engine and the like.

Figure 2:
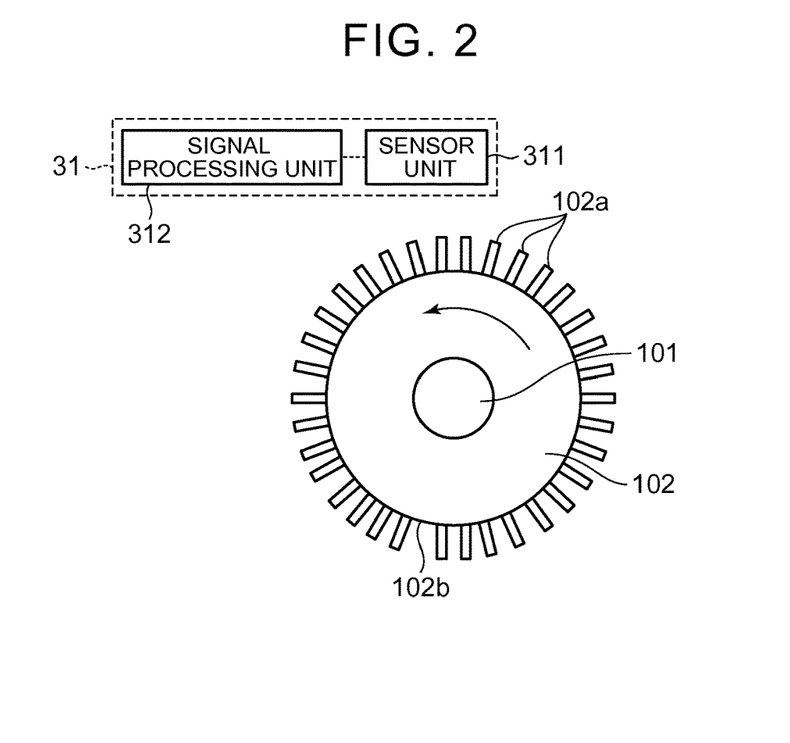
FIG. 2 is a structural view schematically showing the configuration of a crank angle sensor according to the first embodiment of the invention.
Figure 3:
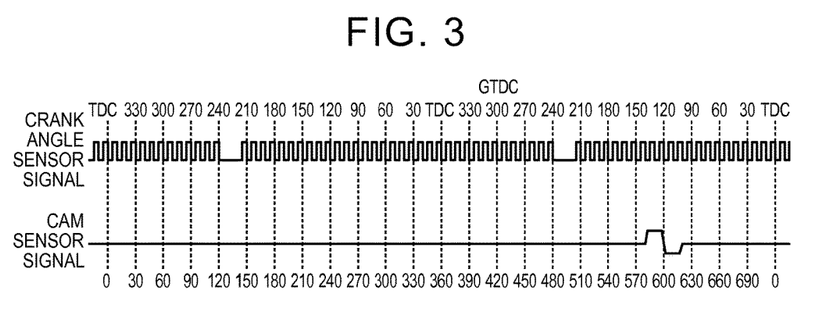
FIG. 3 is an example of a crank angle sensor signal.

The description as to the crank angle sensor 31 will be added herein, with reference to FIGS. 2 and 3. FIG. 2 is a structural view schematically showing the configuration of the crank angle sensor according to the first embodiment of the invention. FIG. 3 is an example of a crank angle sensor signal.

In FIG. 2, a crank rotor 102 that is rotated in a direction indicated by an arrow in the drawing is attached to a crankshaft 101. Tooth portions 102a that are formed at equal angular intervals of, for example, 10° CA, and a non-tooth portion 102b corresponding to a space of two consecutive teeth are provided on an outer periphery of the crank rotor 102, with a view to detecting a crank angle.

The crank angle sensor 31 is configured to be equipped with a sensor unit 311 that faces the respective tooth portions 102a and detects a rotational speed of the crankshaft 101 by the tooth portions 102a, and a signal processing unit 312 that processes an output signal from the sensor unit 311. A crank angle sensor signal that is output from the sensor unit 311 becomes a pulse signal whose cycle corresponds to a period in which the crankshaft 101 rotates by a predetermined crank angle (e.g., 10° CA) when the rotational position of the crankshaft 101 is not a specific position set in advance, and becomes a non-tooth signal whose cycle corresponds to a period in which the crankshaft 101 rotates by, for example, 30° CA when the crankshaft 101 is at the specific position. The non-tooth signal is generated every time the crankshaft 101 rotates fully (i.e., by 360° CA).

Upon receiving an output signal (see a crank angle sensor signal of FIG. 3) from the sensor unit 311, the signal processing unit 312 starts the operation of detecting a non-tooth signal in the crank angle sensor signal. Then, when it is first detected that the crank angle sensor signal has become a non-tooth signal, the signal processing unit 312 thereafter divides the crank angle sensor signal, and generates and outputs a 30° CA signal NE (see FIG. 1) as a pulse signal whose cycle corresponds to a period in which the crankshaft 101 rotates by 30° (i.e., which rises every time the crankshaft 101 rotates by) 30°.

Besides, when the rising of a cylinder identification signal (see a cam sensor signal of FIG. 3) that is output from the cam angle sensor 32 is detected as a camshaft of the engine 10 rotates during a determination period corresponding to a predetermined cycle period of the 30° CA signal NE since the detection of the non-tooth signal, the signal processing unit 312 outputs a reference position signal G at an end timing of the determination period. Accordingly, the reference position signal G rises when the rotational position of the crankshaft 101 reaches a position that is advanced by the predetermined cycle from the specific position where the non-tooth signal is generated. The ECU 20 identifies the cylinder of the engine 10 on the basis of the 30° CA signal NE, the reference position signal G and the like, and controls the engine 10.

Incidentally, the reference position signal G according to this embodiment of the invention is a pulse signal whose cycle corresponds to a period in which the camshaft rotates by 720° (i.e., a 720° CA signal).

(Determination on Rough Road)

The crank angle sensor 31 detects rotation of the tooth portions 102a in accordance with a time variation ($d\phi/dt$) in the magnetic fluxes between the sensor unit 311 and the crank rotor 102. In the case where the vehicle speed of the vehicle 1 and the rotational speed of the engine 10 are constant and the vehicle 1 travels on a normal road, the output (a pulse amplitude) of the crank angle sensor 31 is an output corresponding to the rotational speed of the engine 10 (see the upper left section of FIG. 4).

On the other hand, in the case where the vehicle 1 travels on a rough road, the distance between the sensor unit 311 and the crank rotor 102 fluctuates due to the influence of the rough road. Then, the output (the pulse amplitude) of the crank angle sensor 31 changes as a result of fluctuations in the distance between the sensor unit 311 and the crank rotor 102 as well as the presence/absence of the tooth portions 102a (see "$\Delta X$" in the upper right section of FIG. 4).

Figure 4:
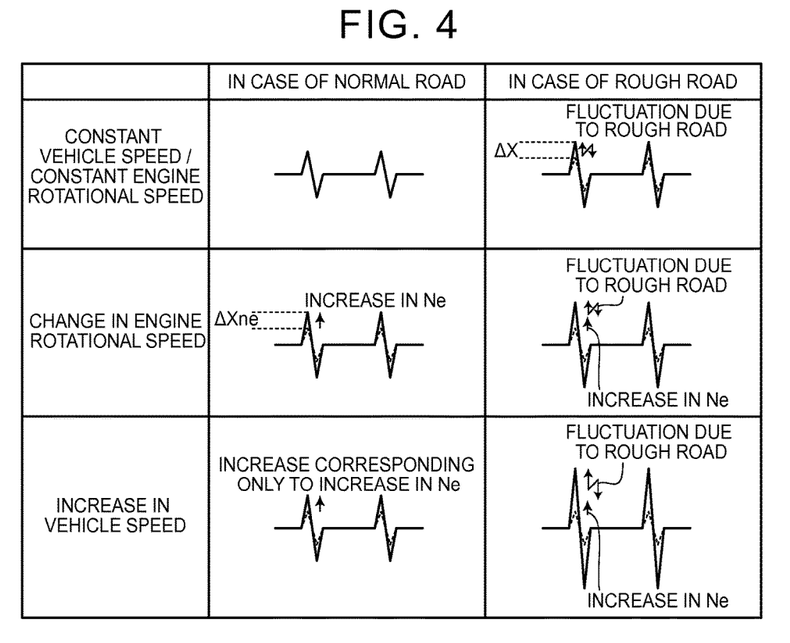
FIG. 4 is a view showing how the amplitude of the crank angle sensor signal changes on each condition.

Besides, when the rotational speed of the engine 10 increases, the change in magnetic fluxes per unit time increases, and the amplitude of the pulse output from the crank angle sensor 31 increases (see "$\Delta Xne$" in the middle left section of FIG. 4). In the case where the vehicle 1 travels on a rough road, the amplitude of the pulse output from the crank angle sensor 31 changes due to the influence of the rough road as well as fluctuations in the rotational speed of the engine 10 (see the right and left sections of FIG. 4).

In the case where the vehicle 1 travels on a normal road, even if the speed of the vehicle 1 changes, the amplitude of the pulse output from the crank angle sensor 31 is influenced only by fluctuations in the rotational speed of the engine 10 (i.e., not influenced by the vehicle speed) (see the lower left section of FIG. 4). On the other hand, in the case where the vehicle 1 travels on a rough road, the impact received by the vehicle 1 from the road surface differs depending on the vehicle speed of the vehicle 1. Therefore, the amplitude of the pulse output from the crank angle sensor 31 increases as the vehicle speed increases (see the lower right section of FIG. 4).

The rough road determination device 100 according to this embodiment of the invention is configured to be equipped with the ECU 20 as an example of "the determination means" according to the invention, which determines whether or not the road on which the vehicle 1 travels is a rough road, by comparing a first amplitude fluctuation amount as an amplitude fluctuation amount of one pulse of an output of the crank angle sensor 31, which is determined in advance on the basis of a rotational speed of the engine 10, with a second amplitude fluctuation amount as an amplitude fluctuation amount of one pulse that is actually output from the crank angle sensor 31. That is, in this embodiment of the invention, the functions of the ECU 20 for various kinds of electronic control of the vehicle 1 are partially used as part of the rough road determination device 100.

Figure 5:
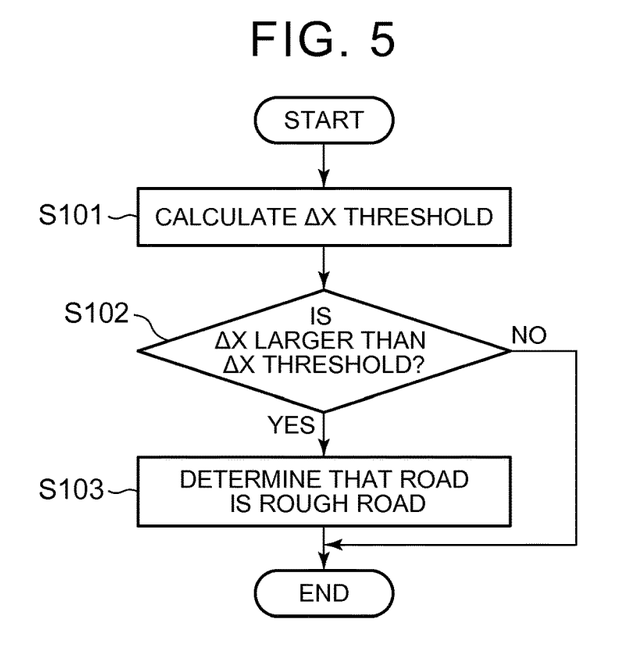
FIG. 5 is a flowchart showing a rough road determination process according to the first embodiment of the invention.

The description as to a rough road determination process that is performed by the ECU 20 as part of the rough road determination device 100 will be added, with reference to a flowchart of FIG. 5.

Figure 6:
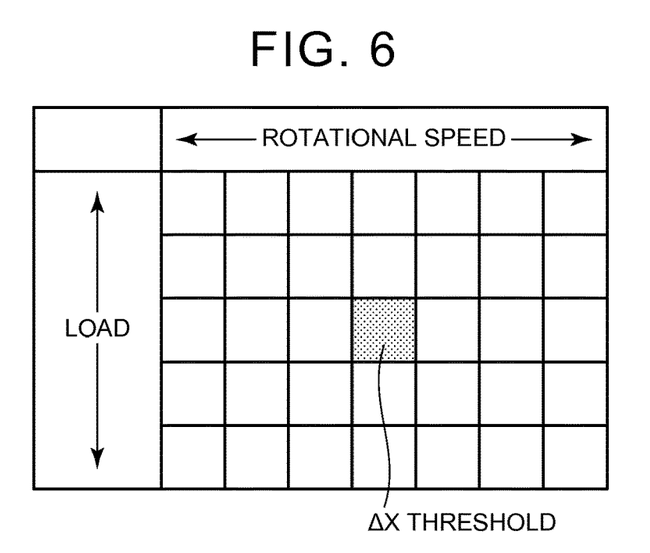
FIG. 6 is an example of a map that prescribes a $\Delta X$ threshold.

In FIG. 5, the ECU 20 first calculates a $\Delta X$ threshold as an example of "the first amplitude fluctuation amount" from a rotational speed and a load of the engine 10 and a map shown in, for example, FIG. 6 (step S101). FIG. 6 is an example of a map that prescribes the $\Delta X$ threshold. Incidentally, various known aspects can be applied to a method of detecting the rotational speed and the load of the engine 10. Therefore, the description of such a method is omitted herein.

Subsequently, the ECU 20 determines whether or not an amplitude fluctuation amount $\Delta X$ of one pulse that is actually output from the crank angle sensor 31 (i.e., the second amplitude fluctuation amount) is larger than the calculated $\Delta X$ threshold (step S102). When it is determined that the amplitude fluctuation amount $\Delta X$ is larger than the calculated $\Delta X$ threshold (Yes: step S102), the ECU 20 determines that the road on which the vehicle 1 travels is a rough road (step S103), and ends the process.

On the other hand, when it is determined that the amplitude fluctuation amount $\Delta X$ is smaller than the calculated $\Delta X$ threshold (No: step S102), the ECU 20 ends the process. Incidentally, the case where the amplitude fluctuation amount $\Delta X$ is "equal" to the calculated $\Delta X$ threshold may be classified into one of the above-mentioned cases.

Second Embodiment

The second embodiment of the rough road determination device according to the invention will be described with reference to FIGS. 7 and 8. The second embodiment of the invention is identical in configuration to the first embodiment of the invention except in part of the rough road determination process. In consequence, as for the second embodiment of the invention, the same description as in the first embodiment of the invention is omitted, and common components in the drawings are denoted by the same reference symbols respectively. Only the basic difference between these embodiments of the invention will be described with reference to FIGS. 7 and 8.

Figure 7:
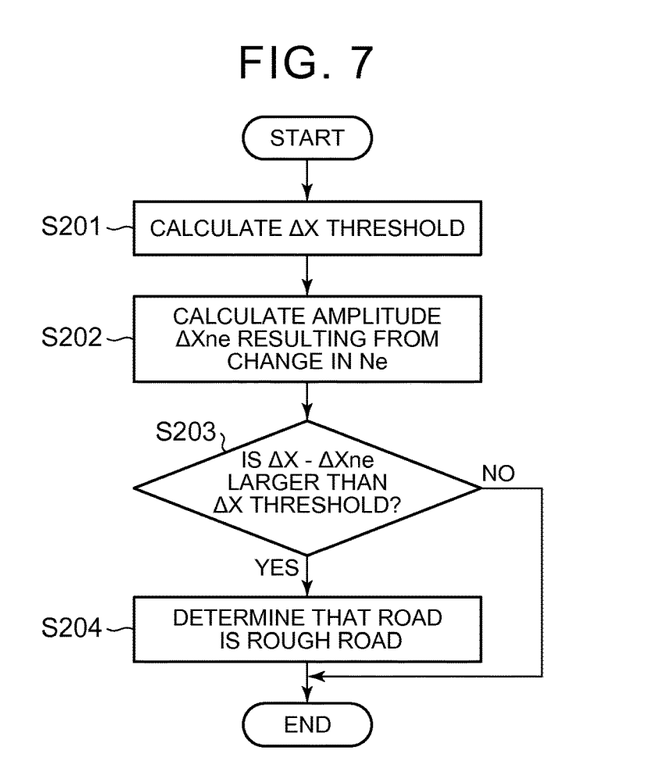
FIG. 7 is a flowchart showing a rough road determination process according to a second embodiment of the invention.
Figure 8:
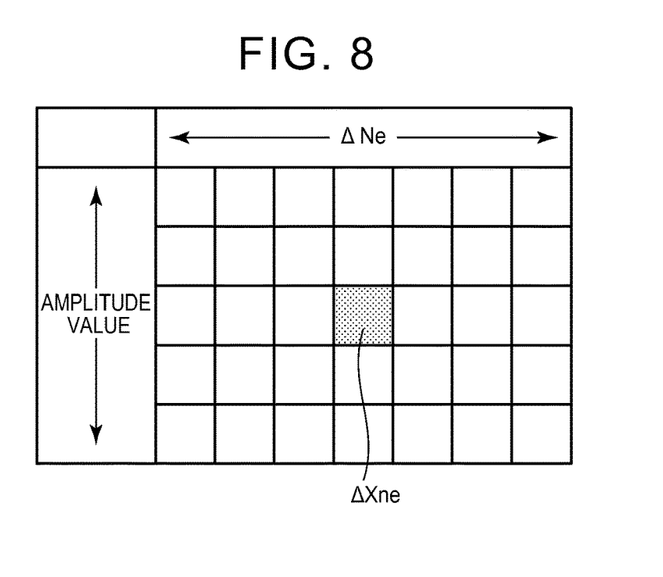
FIG. 8 is an example of a map that prescribes an amplitude fluctuation value that results from a fluctuation in the rotational speed of an engine.

In a flowchart of FIG. 7, the ECU 20 first calculates a ΔX threshold from a rotational speed and a load of the engine 10 and a map shown in, for example, FIG. 6 (step S201). Subsequently, the ECU 20 calculates an amplitude fluctuation value ΔXne resulting from a fluctuation in the rotational speed of the engine 10, from the fluctuation (ΔNe) in the rotational speed of the engine 10, an amplitude value of a pulse that is actually output from the crank angle sensor 31, and a map shown in, for example, FIG. 8 (step S202). FIG. 8 is an example of a map that prescribes the amplitude fluctuation value resulting from the fluctuation in the rotational speed of the engine.

Subsequently, the ECU 20 determines whether or not a value (ΔX–ΔXne) obtained by subtracting the calculated amplitude fluctuation value ΔXne from the amplitude fluctuation amount ΔX of one pulse that is actually output from the crank angle sensor 31 is larger than the calculated ΔX threshold (step S203).

When it is determined that "ΔX–ΔXne" is larger than the calculated ΔX threshold (Yes: step S203), the ECU 20 determines that the road on which the vehicle 1 travels is a rough road (step S204), and ends the process. On the other hand, when it is determined that "ΔX–ΔXne" is smaller than the calculated ΔX threshold (No: step S203), the ECU 20 ends the process.

Third Embodiment

The third embodiment of the rough road determination device according to the invention will be described with reference to FIGS. 9 and 10. The third embodiment of the invention is identical in configuration to the second embodiment of the invention except in part of the rough road determination process. In consequence, as for the third embodiment of the invention, the same description as in the second embodiment of the invention is omitted, and common components in the drawings are denoted by the same reference symbols respectively. Only the basic difference between these embodiments of the invention will be described with reference to FIGS. 9 and 10.

Figure 9:
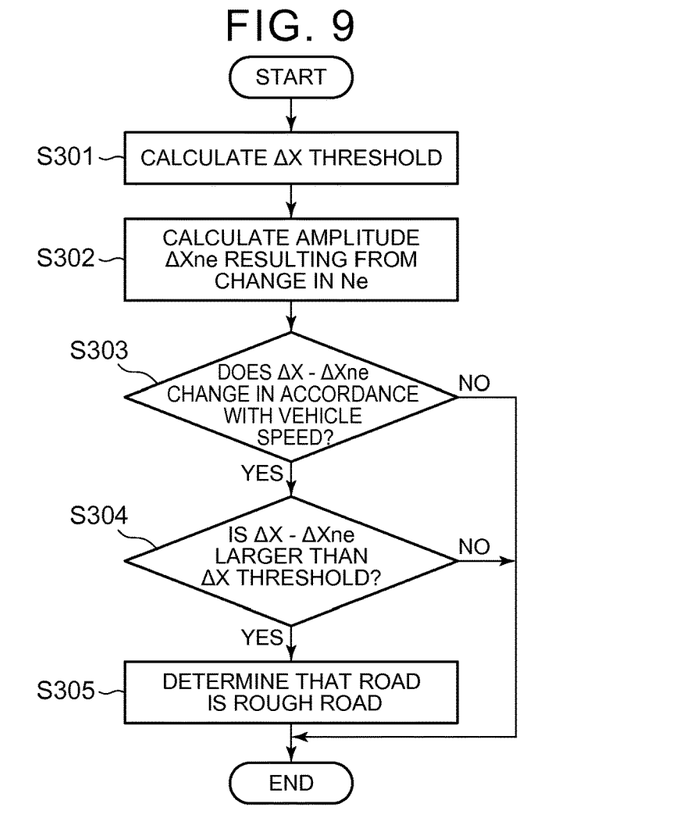
FIG. 9 is a flowchart showing a rough road determination process according to a third embodiment of the invention.

In a flowchart of FIG. 9, the ECU 20 first calculates a ΔX threshold from a rotational speed and a load of the engine 10 and a map shown in, for example, FIG. 6 (step S301). Subsequently, the ECU 20 calculates an amplitude fluctuation value ΔXne resulting from a fluctuation in the rotational speed of the engine 10, from the fluctuation (ΔNe) in the rotational speed of the engine 10, an amplitude value of a pulse that is actually output from the crank angle sensor 31, and a map shown in, for example, FIG. 8 (step S302).

Subsequently, the ECU 20 determines whether or not a value (ΔX–ΔXne) obtained by subtracting the calculated amplitude fluctuation value ΔXne from the amplitude fluctuation amount ΔX of one pulse that is actually output from the crank angle sensor 31 changes in accordance with a vehicle speed of the vehicle 1 (step S303).

Figure 10:
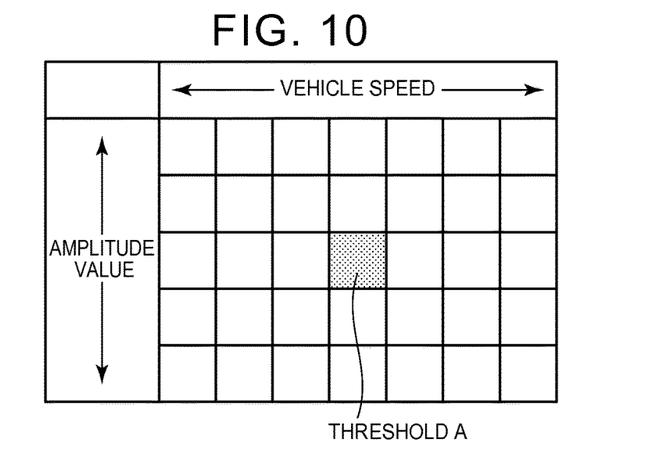
FIG. 10 is an example of a map that prescribes a threshold A.

Concretely, the ECU 20 first determines whether or not a value obtained by dividing "ΔX–ΔXne" by the vehicle speed (i.e., "(ΔX–ΔXne)/the vehicle speed") is larger than a threshold A that is specified by a map shown in, for example, FIG. 10. Then, the ECU 20 determines that "ΔX–ΔXne" changes in accordance with the vehicle speed of the vehicle 1, on the condition that "(ΔX–ΔXne)/the vehicle speed" be larger than the threshold A. FIG. 10 is an example of a map that prescribes the threshold A.

When it is determined that "ΔX–ΔXne" changes in accordance with the vehicle speed of the vehicle 1 (Yes: step S303), the ECU 20 determines whether or not "ΔX–ΔXne" is larger than the calculated ΔX threshold (step S304). When it is determined that "ΔX–ΔXne" is larger than the calculated ΔX threshold (Yes: step S304), the ECU 20 determines that the road on which the vehicle 1 travels is a rough road (step S305), and ends the process.

On the other hand, when it is determined that "ΔX–ΔXne" is smaller than the calculated ΔX threshold (No: step S304), the ECU 20 ends the process. Besides, when it is determined that "ΔX–ΔXne" does not change in accordance with the vehicle speed of the vehicle 1 as well (No: step S303), the ECU 20 ends the process.

The invention is not limited to the foregoing embodiments thereof, but can be appropriately modified without contradicting the gist or concept of the invention readable from the claims and the entire specification. A rough road determination device thus modified is also encompassed in the technical scope of the invention.

DESCRIPTION OF REFERENCE NUMERALS

1 . . . VEHICLE
10 . . . ENGINE
20 . . . ECU
31 . . . CRANK ANGLE SENSOR
32 . . . CAM ANGLE SENSOR
100 . . . ROUGH ROAD DETERMINATION DEVICE
101 . . . CRANKSHAFT
102 . . . CRANK ROTOR
311 . . . SENSOR UNIT
312 . . . SIGNAL PROCESSING UNIT

The invention claimed is:

1. A rough road determination device for a vehicle, the vehicle having an internal combustion engine and a crank angle sensor that is installed in the internal combustion engine, the rough road determination device comprising: an ECU configured to determine whether or not a road on which the vehicle travels is a rough road, by comparing a first amplitude fluctuation amount with a second amplitude fluctuation amount, the first amplitude fluctuation amount being an amplitude fluctuation amount of one pulse of an output of the crank angle sensor and being determined in advance on a basis of a rotational speed of the internal combustion engine, and the second amplitude fluctuation amount being an amplitude fluctuation amount of one pulse that is actually output from the crank angle sensor, and to control with the ECU an ignition timing of the internal combustion engine according to the rough road determination.

2. The rough road determination device according to claim 1, wherein
the ECU determines whether or not the road on which the vehicle travels is the rough road, by comparing a differential value, which is a value that is obtained by subtracting an amplitude value resulting from the rotational speed of the internal combustion engine from the second amplitude fluctuation amount, with the first amplitude fluctuation amount.

3. The rough road determination device according to claim 2, wherein
the ECU determines whether or not the road on which the vehicle travels is the rough road, by comparing the differential value with the first amplitude fluctuation amount when the differential value changes in accordance with a speed of the vehicle.

4. The rough road determination device according to claim 1, wherein
the ECU determines that the road on which the vehicle travels is the rough road, when a difference between the first amplitude fluctuation amount and the second amplitude fluctuation amount is equal to or larger than a predetermined value.

5. The rough road determination device according to claim 1, wherein
the ECU determines that the road on which the vehicle travels is the rough road, when a difference between the first amplitude fluctuation amount and the second amplitude fluctuation amount changes in accordance with a speed of the vehicle.

6. The rough road determination device according to claim 1, wherein
the ECU determines that the road on which the vehicle travels is the rough road, when the second amplitude fluctuation amount is equal to or larger than the first amplitude fluctuation amount.

7. A rough road determination method for a vehicle, the vehicle having an internal combustion engine, a crank angle sensor that is installed in the internal combustion engine and an ECU, the rough road determination method comprising: calculating a first amplitude fluctuation amount by the ECU, the first amplitude fluctuation amount being an amplitude fluctuation amount of one wise of an output of the crank angle sensor; calculating a second amplitude fluctuation amount by the ECU, the second amplitude fluctuation amount being an amplitude fluctuation amount of one pulse that is actually output from the crank angle sensor and being determined in advance on a basis of a rotational speed of the internal combustion engine; determining by the ECU whether or not a road on which the vehicle travels is a rough road, by comparing the first amplitude fluctuation amount with the second amplitude fluctuation amount in order to control with the ECU an ignition timing of the internal combustion engine according to the rough road determination.

8. The rough road determination method according to claim 7, wherein
the ECU determines that the road on which the vehicle travels is the rough road, when the second amplitude fluctuation amount is equal to or larger than the first amplitude fluctuation amount.

9. The rough road determination method according to claim 8, wherein
the ECU determines that the road on which the vehicle travels is the rough road, when a difference between the first amplitude fluctuation amount and the second amplitude fluctuation amount is equal to or larger than a predetermined value.

* * * * *